United States Patent
Chin et al.

(10) Patent No.: US 8,479,391 B2
(45) Date of Patent: Jul. 9, 2013

(54) CONSUMABLE COLLAR FOR LINEAR FRICTION WELDING OF BLADE REPLACEMENT FOR DAMAGED INTEGRALLY BLADED ROTORS

(75) Inventors: Herbert A. Chin, Portland, CT (US); Robert P. Schaefer, Vernon Rockville, CT (US); Eberhardt Privitzer, Los Lunas, NM (US); Wangen Lin, South Glastonbury, CT (US); Billie W. Bunting, Colchester, CT (US); James J. Moor, New Hartford, CT (US); Vincent Nevins, Jr., Chester, CT (US); Andrew L. Haynes, Glastonbury, CT (US); Greg Czeladko, Avon, CT (US); Kenneth T. Raczewski, Columbia, CT (US)

(73) Assignee: United Technologies Corporation, Hartford, CT (US)

( * ) Notice: Subject to any disclaimer, the term of this patent is extended or adjusted under 35 U.S.C. 154(b) by 763 days.

(21) Appl. No.: 12/639,215

(22) Filed: Dec. 16, 2009

(65) Prior Publication Data
US 2011/0138624 A1 Jun. 16, 2011

(51) Int. Cl.
*B23K 20/12* (2006.01)
*B23K 31/00* (2006.01)
*B23P 6/00* (2006.01)

(52) U.S. Cl.
USPC ............ 29/889.1; 29/402.13; 29/402.16; 228/2.1; 228/44.3; 228/112.1; 228/119; 228/212

(58) Field of Classification Search
USPC .......... 29/402.01, 402.08, 889.1, 889.21, 29/402.13, 402.16; 228/2.1, 112.1, 212, 44.3; 416/223 R
See application file for complete search history.

(56) References Cited

U.S. PATENT DOCUMENTS

| | | | |
|---|---|---|---|
| 4,873,751 A | | 10/1989 | Walker et al. |
| 4,883,216 A | * | 11/1989 | Patsfall .................... 228/119 |
| 4,934,583 A | | 6/1990 | Patsfall |
| 5,031,288 A | | 7/1991 | Sadler |
| 5,035,411 A | | 7/1991 | Daines et al. |
| 5,109,606 A | | 5/1992 | DeMichael et al. |
| 5,185,045 A | | 2/1993 | Peters et al. |
| 5,188,275 A | | 2/1993 | Daines |
| 5,197,190 A | | 3/1993 | Coolidge |

(Continued)

FOREIGN PATENT DOCUMENTS

| EP | 0624418 A2 | 11/1994 |
|---|---|---|
| EP | 0669183 A1 | 2/1995 |

(Continued)

OTHER PUBLICATIONS

European Search Report for European Patent Application No. 10252108.5-2321 completed on Jan. 11, 2013.

(Continued)

*Primary Examiner* — Alexander P Taousakis
(74) *Attorney, Agent, or Firm* — Carlson, Gaskey & Olds, PC

(57) ABSTRACT

A method of repairing an integrally bladed rotor includes the steps of placing a support collar around at least a leading and trailing edge portions of the blade stub, and performing linear friction welding to add a replacement airfoil to the blade stub. The linear friction welding is generally along a direction between the leading and trailing edges. In addition, the support collar leading and trailing edge portions are connected together.

6 Claims, 2 Drawing Sheets

U.S. PATENT DOCUMENTS

| | | | |
|---|---|---|---|
| 5,306,897 A | 4/1994 | Fraser | |
| 5,484,983 A | 1/1996 | Roell | |
| 5,486,262 A * | 1/1996 | Searle | 156/580 |
| 5,489,194 A | 2/1996 | Yoshinari et al. | |
| 5,492,581 A | 2/1996 | Searle | |
| 5,551,623 A | 9/1996 | Collot et al. | |
| 5,609,471 A | 3/1997 | Frasier et al. | |
| 5,813,593 A * | 9/1998 | Galaske, Jr. | 228/112.1 |
| 5,865,364 A | 2/1999 | Trask et al. | |
| 6,536,110 B2 | 3/2003 | Smith et al. | |
| 6,787,740 B2 | 9/2004 | Smith et al. | |
| 8,006,380 B2 * | 8/2011 | Rawson et al. | 29/889.1 |
| 2002/0127108 A1 | 9/2002 | Crall et al. | |
| 2011/0005075 A1 * | 1/2011 | Trewiler et al. | 228/212 |
| 2011/0138624 A1 * | 6/2011 | Chin et al. | 29/889.1 |
| 2011/0219616 A1 * | 9/2011 | Bayer et al. | 29/889.1 |
| 2012/0148413 A1 * | 6/2012 | Richter et al. | 29/889.1 |

FOREIGN PATENT DOCUMENTS

| | | |
|---|---|---|
| EP | 0841470 | 5/1998 |
| EP | 0850718 | 7/1998 |
| EP | 1604770 | 12/2005 |
| FR | 2629133 | 9/1989 |
| GB | 2277896 | 11/1994 |

OTHER PUBLICATIONS

Singapore Search Report for Singapore Patent Application No. 201107279-0 dated Sep. 27, 2012.

\* cited by examiner

CONSUMABLE COLLAR FOR LINEAR FRICTION WELDING OF BLADE REPLACEMENT FOR DAMAGED INTEGRALLY BLADED ROTORS

BACKGROUND OF THE INVENTION

This application relates to a method of repairing damaged blades on an integrally bladed rotor.

Gas turbine engines typically include a compressor section which compresses air and delivers that air downstream into a combustion section. The air mixes with fuel in the combustion section and is burned. Products of this combustion pass downstream over turbine rotors, driving the turbines to rotate. In one well known type of gas turbine engine, a fan is positioned to deliver a portion of air into the compressor, and a portion of air as a propulsion source outwardly of the remainder of the gas turbine engine.

With both the fan and compressor sections, rotors including a plurality of blades are utilized. Recently, the concept of an integrally bladed rotor has been developed and utilized for both fan and compressor applications. In such a rotor, a rotor hub includes a plurality of blades metallurgically joined to the hub. The integrally bladed rotor may be formed of various highly engineered materials, such as titanium alloy materials.

When one of the blades on an integrally bladed rotor is damaged, it must be repaired or replaced according to the extent of the damage. The replacement of these blades and repair of the integrally bladed rotors has proven challenging.

One type of repair to an integrally bladed rotor is linear friction welding; specifically along a direction generally between a leading and trailing edge of the airfoil for the blade, commonly referred to as the chord-wise direction. Under such known methods, support collars are provided about both the leading and trailing edges to provide structural stiffness of those regions parallel and perpendicular to the chord-wise direction, but with unsupported intermediate portions. Prior art arrangements have not provided adequate support for linear friction welding in the chord-wise direction.

SUMMARY OF THE INVENTION

A method of repairing an integrally bladed rotor includes the steps of placing a support collar around at least a leading and trailing edge portions of the blade stub, and performing linear friction welding to add a replacement airfoil to the blade stub. The linear friction welding is generally along a direction between the leading and trailing edges. In addition, the support collar leading and trailing edge portions are connected together.

These and other features of the present invention can be best understood from the following specification and drawings, the following of which is a brief description.

DETAILED DESCRIPTION OF THE PREFERRED EMBODIMENT

Figure 1:
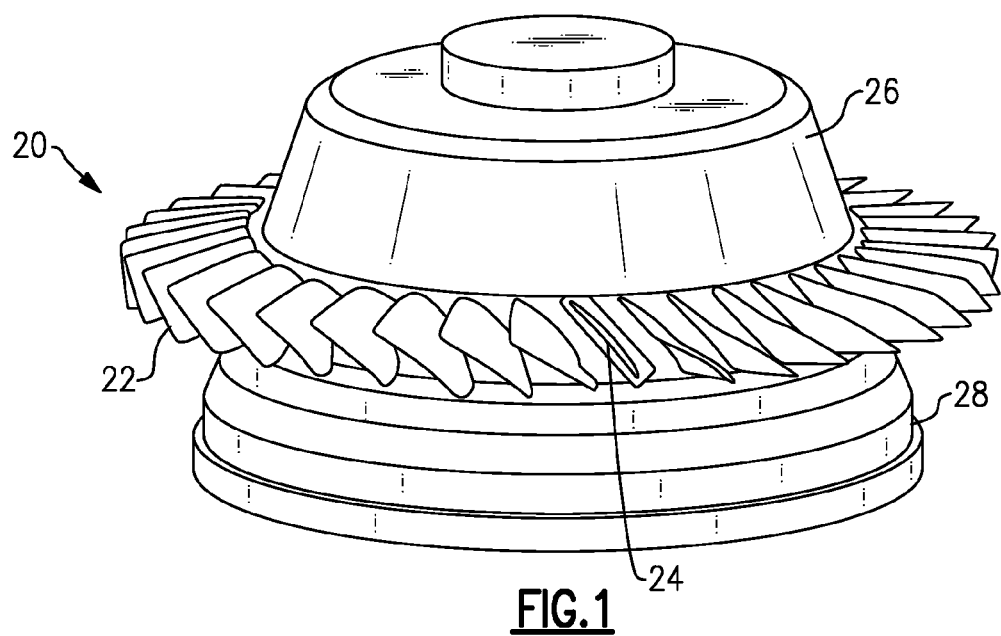
FIG. 1 shows a system for repairing an integrally bladed rotor.

FIG. 1 shows an integrally bladed rotor 20 including operational blades 22, and a damaged blade stub 24. The damaged blade stub 24 is to be repaired to include a new airfoil, and is shown mounted in a linear friction welding machine incorporating holding portions 26 and 28. Generally, the first step is to remove the damaged blade to a prescribed cut plane to remove all damaged portions.

Figure 2:
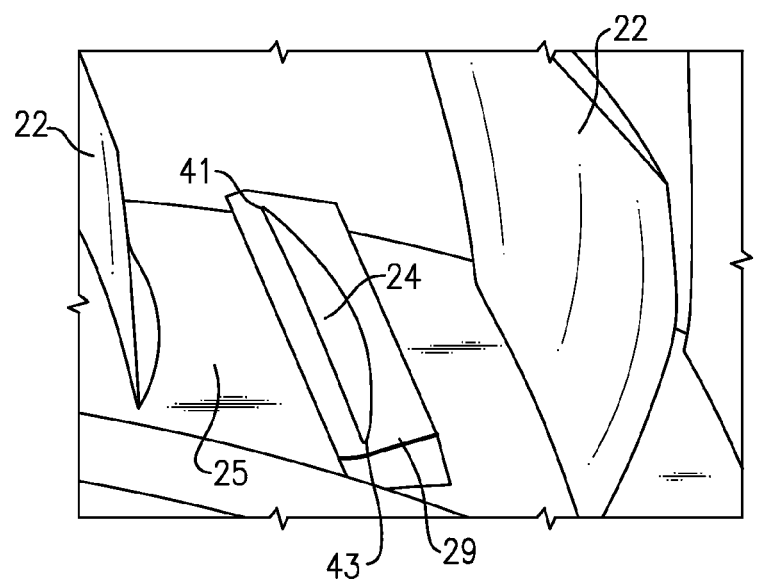
FIG. 2 shows a detail of the FIG. 1 system.

As shown in FIG. 2, the stub 24 is provided with a consumable collar 29. The consumable collar may be made of the same material as the rotor and blade, and is formed to have an internal cavity that is about the same size and shape of the blade stub in question. Rather than being formed of the same material, the collar could also be made of a different material, depending on engineering requirements. It is desirable that the maximum gaps between the cavity in the collar, and the outer periphery of the blade be small (e.g., 0.04 inch, 1.02 mm, or less).

Figure 3:
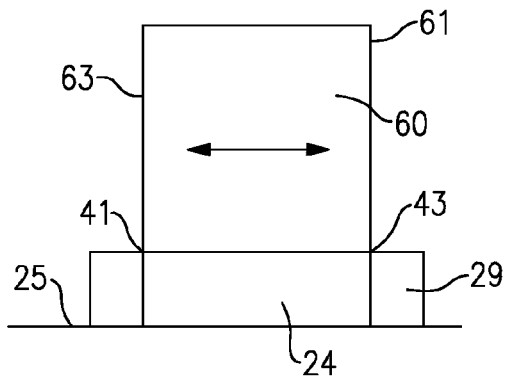
FIG. 3 schematically shows a linear friction welding operation.

As shown in FIG. 2, the collar 29 is mounted on the blade stub 24. The blade stub 24 extends between a leading edge 41 and a trailing edge 43. The collar supports the blade stub as a linear friction welding operation, explained schematically with reference to FIG. 3, is performed. In particular, as shown in FIG. 3, the linear friction welding includes moving a new airfoil blank 60 (having a leading edge 63 and a trailing edge 61) rapidly relative to the blade stub 24, with an axial compressive force, and in a direction generally parallel to a dimension between the leading and trailing edges. By moving the airfoil 60 and blade stub 24 rapidly relative to each other, heat is built up, and the two sections weld together in the solid state. The linear friction welding technique is known.

In the prior art, there has been little support at the leading edge and trailing edge portions, which come to very fine points in production blades. Thus, there has been challenges at performing linear friction welding, and particularly at the leading and trailing edges of a blade stub which does not have sufficient cross-sectional area to be structurally stiff and stationary during linear friction welding. As an example, the prior art had two unconnected collar portions at the leading and trailing edges. This did not provide adequate support.

As can be appreciated from FIG. 3, the collar 29 provides additional structural support during the linear friction welding, and thus results in a robust reliable bond being formed between the airfoil 60 and the blade stub 24.

Figure 4:
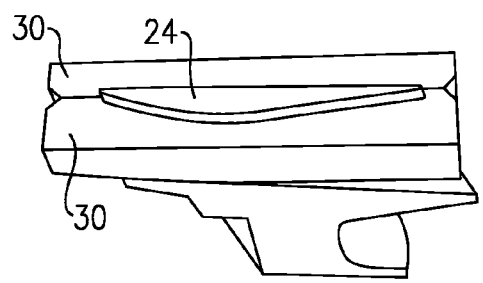
FIG. 4 shows an embodiment of a collar according to this application.

As shown in FIG. 4, the collar can be provided by two separate portions 30 which fit around the blade stub 24.

Figure 5:
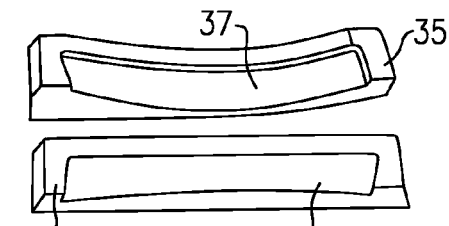
FIG. 5 shows another embodiment.

As shown in FIG. 5, the collar may have portions 35 with an internal cavity 37 that actually extends above the blade stub 21. In this embodiment, there will be material from the collar actually sitting between the blade stub and the airfoil blank in the final repaired rotor.

Figure 6:
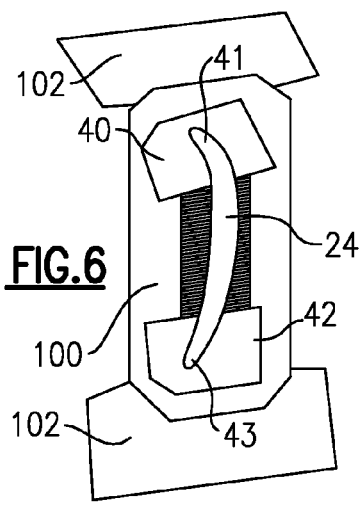
FIG. 6 shows yet another embodiment.

As shown in FIG. 6, it is also possible for the collar to be formed of separate portions 40 and 42 only supporting the leading and trailing edges 41 and 43. As shown, the two sub-collars support the edges, with unsupported portions at the outer circumference of the stub allowed between the two sub-collar portions 40 and 42. Thus, a collar holder 100 connects the leading and trailing edge sub-collar portions 40 and 42. In addition, tooling 102 may be provided to hold the collar support 100.

Figure 7:
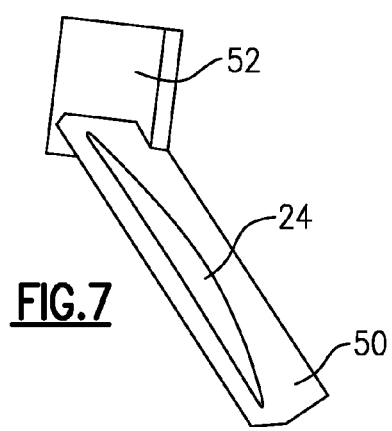
FIG. 7 shows a machining connection which may be incorporated with the inventive embodiments.

Further, as shown in FIG. 7, the machine for linear friction welding can be provided with a holding jig or support tooling 52 which holds the collar 50 on the blade stub 24 during the linear friction welding operation.

In general, the collars are provided at both the leading and trailing edges of the airfoil. Some structure interconnects those collar sub-portions. In some embodiments (FIGS. 2, 4, and 5), the collar integrally connects the two. In other embodiments (FIG. 6), there are two separate collar sub-portions that are connected together by a collar holding member.

The collar may have enlarged regions about the leading and trailing edges of the airfoil for additional structural support. Further, the collar may have sufficient height to exceed the prescribed linear friction weld "burn-off" or to ensure that the collar itself will be at least partially consumed during the linear friction welding operation.

In addition, there may be an enlarged structural base below and integral to the contoured collar region described above. This additional base can provide added structural support to the contoured region of the consumable collar. Further, the area of attachment of the collar to the rotor surface may be increased to provide radial support during the linear friction weld operation.

The support tooling such as shown in FIGS. 6 and 7 may not always be necessary, however, in situations where the blade stubs are deemed of insufficient structural stiffness (small cord length or small cross-section, as an example), and which may be determined by structural analysis, then support structure as shown may be utilized. As can be seen, the collars may be structurally bolstered by other rigid members at the chord-wise ends. Those rigid members may be attached to both the collar, and to the linear friction weld machine support super-structure, or to the linear friction weld rotor support super-structure only.

The overall method is to initially prepare the blade stub for machining. The consumable collar, sized to fit between the adjacent blades, may be selected. The collar may be designed for optimal load distribution to the rotor, and to interact with any tooling such as shown in FIG. 6 or 7. An airfoil or blade block (or replacement airfoil) is then linear friction welded to the blade stub using linear friction welding parameters and techniques. Then, the consumable collar is machined away, along with the linear friction welding joint, to approximate the final desired size and shape of the blade dimension. Localized stress relief heat treating may be provided at the linear friction weld joint. Then, some final machining may occur to move the repaired blade to final blueprint dimensions.

Although embodiments of this invention have been disclosed, a worker of ordinary skill in this art would recognize that certain modifications would come within the scope of this invention. For that reason, the following claims should be studied to determine the true scope and content of this invention.

What is claimed is:

1. A method of repairing an integrally bladed rotor comprising the steps of:
    placing a support collar around at least a leading and trailing edge portions of a blade stub to be repaired in an integrally bladed rotor, with said support collar having leading and trailing edge sub-portions that are connected by a collar-holding member;
    performing linear friction welding to add a replacement airfoil to said blade stub and the linear friction welding occurring generally along a direction between the trailing and leading edges;
    a support tooling is provided on a linear friction welding machine to support said collar during the linear friction welding operation; and
    including the steps of machining away the collar after the linear friction welding is complete.

2. The method as set forth in claim 1, wherein said collar surrounds an entire perimeter of said blade stub.

3. The method as set forth in claim 1, wherein said blade stub and said support collar are formed of the same material.

4. The method as set forth in claim 3, wherein said same material is a titanium alloy.

5. The method as set forth in claim 1, wherein said blade stub and said collar are formed of different materials.

6. The method as set forth in claim 1, further including the steps of removing a damaged airfoil to a prescribed cut plane prior to placing the collar around the blade stub.

* * * * *